United States Patent [19]

White

[11] 4,153,896
[45] May 8, 1979

[54] COMPRESSION AND EXPANSION OF SYMBOLS

[75] Inventor: Roy L. White, Melbourn, England

[73] Assignee: Xenotron Limited, London, England

[21] Appl. No.: 812,343

[22] Filed: Jul. 1, 1977

[30] Foreign Application Priority Data

Jul. 8, 1976 [GB] United Kingdom ............... 28522/76

[51] Int. Cl.² .......................... G06K 9/00; G06F 3/14
[52] U.S. Cl. ............................ 340/731; 340/146.3 H; 340/146.3 AH; 340/750; 364/521; 364/811; 340/146.3 MA
[58] Field of Search .......... 340/146.3 MA, 146.3 AH, 340/146.3 H, 324 A, 324 AD, 324 M; 358/260

[56] References Cited

U.S. PATENT DOCUMENTS

| | | | |
|---|---|---|---|
| 3,289,164 | 11/1966 | Rabinow | 340/146.3 H |
| 3,710,323 | 1/1973 | Andrews et al. | 340/146.3 H |
| 3,735,388 | 5/1973 | Naka | 340/324 AD |
| 3,896,428 | 7/1975 | Williams | 340/324 AD |
| 3,967,243 | 6/1976 | Kawa | 340/146.3 MA |

*Primary Examiner*—Leo H. Boudreau
*Attorney, Agent, or Firm*—Charles A. Laff; J. Warren Whitesel; Howard B. Rockman

[57] ABSTRACT

Separate portions of an image are identified as distinct areas, each of which is identified by a code. Coded signals representing lines extending in one direction across the image are read out of a first store under the control of clocking signals in serial form at a given clock rate to expand or compress the image in one direction. The signals are fed out via an averaging circuit which improves the picture definition and they are fed into a second store. The signals are then read out of the second store in serial form and under the control of clock pulses via a second averaging circuit which improves the picture definition by scanning in lines extending in a second direction to compress or expand the image in a second dimension.

3 Claims, 5 Drawing Figures

COMPRESSION AND EXPANSION OF SYMBOLS

This invention relates to a method and apparatus for use in enabling a visual representation of an image, which may, for example, be a symbol, a character or a text, such as an advertisement including symbols and printed matter, to be reproduced with proportions different from those of the original image.

It is possible, by means of a method and apparatus in accordance with the present invention, to provide, for example, a representation of an image whose height and width are related respectively to those of the image by different factors, or in which the size of a first part of representation is related to that of the corresponding part of the original image by a factor which is different from that relating a second part of the respresentation to its corresponding part in the original image.

Analog arrangements have previously been proposed in which the dimensions of a representation on a cathode ray tube are varied by varying the amplitude of either one or both of the vertical and horizontal scanning signals so that the overall height and/or width of the representation are varied.

These arrangements have the disadvantage that they require a complex cathode ray tube in which various areas of the screen may be accessed in a random manner by the electron beam. Also the compressed or expanded information is not available in digital form for subsequent processing.

The present invention makes possible the separate treatment of portions of an image by identifying distinct areas of an image, representing each of them by means of a code and operating upon the electrically encoded signals before applying them to a read-out device for display.

In the preferred embodiment, an image is divided notionally in the process of encoding in a reticulate manner and each of the regions defined by the reticulations is coded according to its colour. A simple mark-space or binary code is used, black spaces being coded "mark" resulting in a binary digit signal 1 and white spaces being coded "space" resulting in a binary digit signal 0.

It will be appreciated that more complex forms of coding could be employed. For example, for the purpose of conveying information relating to shaded areas or to colours, the level of brightness of the colour of each of the regions defined by the reticulations could be encoded in a binary coded decimal notation.

The coded information can be conveyed over distances, if required, via normal data links to enable, for example, the setting-up of copy, including advertisements, to be remotely controlled.

According to one aspect of the present invention, there is provided a method of providing a representation of an image, whose dimensions are different from those of the image, which includes the steps of feeding into a first store coded information derived by scanning the image in a first direction, reading out the information in the first store in serial form under the control of a first clock signal, reading the information read-out from the first store in serial form under the control of a second clock signal into a second matrix store to provide a record of information corresponding to the image scanned, scanning the information in the second store in a second direction to provide a serial read-out of the information in the second store under the control of a third clock signal, reading the information read-out from the second store into a third store under the control of a fourth clock signal, reading-out information in the third store and displaying the information read-out from the third store in a display device.

According to another aspect of the invention, there is provided apparatus for use in the above method which includes a first store, means for reading information derived by scanning an image in a first direction into the first store, a first clock signal generator, the first clock signal generator being connected to the first store to control the rate at which information is read out of the first store in serial form, a second matrix store, the output of the first store being connected to the input of the second store whereby information read out of the first store can be read into the second store, a second clock pulse generator connected to the second store to control the rate at which information is read into the second store, means to scan the second store in a second direction to provide a read-out in serial form from the second store, a third clock pulse generator connected to the second store to control the rate at which information is read out from the second store, a third store, the input of the third store being connected to the output of the second store whereby information from the second store can be read into the third store, a fourth clock pulse generator connected to the third store to control the rate at which information from the second store is read into the third store, a display device and means to couple an output from the third store to the display device.

The relationships between the frequencies of the first and second clock pulse generators and between the frequencies of the third and fourth clock pulse generators determine the compression or expansion of the information constituting the image in the first and the second directions respectively.

If the first direction corresponds to the vertical direction and the second direction corresponds to the horizontal direction in respect of the way in which the image is displayed, it is possible, by making the frequencies of the first and second pulse generators equal and the frequency of the fourth clock generator less than the frequency of the third clock generator, to produce a representation having no change in size in the vertical direction and a reduction in size in the horizontal direction.

It is also possible, by suitably programming a clock pulse generator to change the frequency of a generator during the scanning of an image so that a different dimensional change is made in the representation of one part of an image from that made in the representation of another part of the same image.

A feature of a particular embodiment of the invention is the use of an averaging circuit connected in the output of either or both of the first and second stores. The averaging circuit measures the average signal level during each of the store output clock pulses and, if the average signal level during this period is greater than 50% of the maximum expected level of the signal, the circuit ensures that a signal representing the maximum level signal, e.g. 1, is transmitted, while if the average signal during the period is less than 50% of the maximum, a minimum level signal, e.g. 0, is transmitted.

Embodiments of the invention will now be described, by way of example, with reference to the accompany drawings in which.

Figure 3:
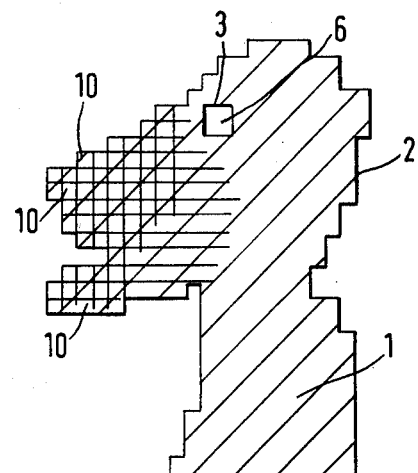
FIG. 3 shows a representation of the image of FIG. 1 compressed in both the vertical and the horizontal directions to a third of its original size.
Figure 3:
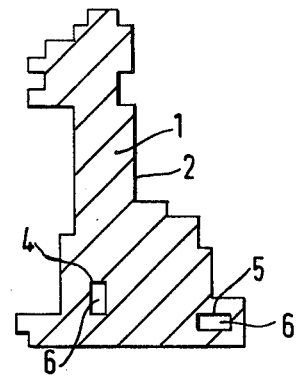
Figure 1:
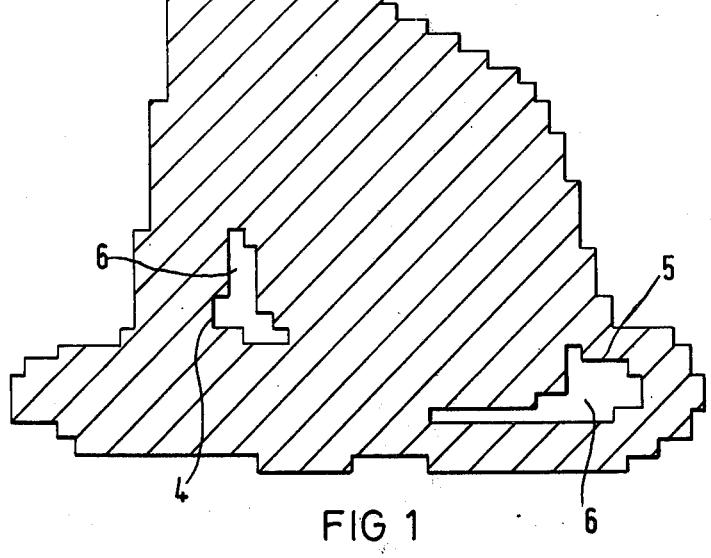
FIG. 1 shows an original image.
Figure 2:
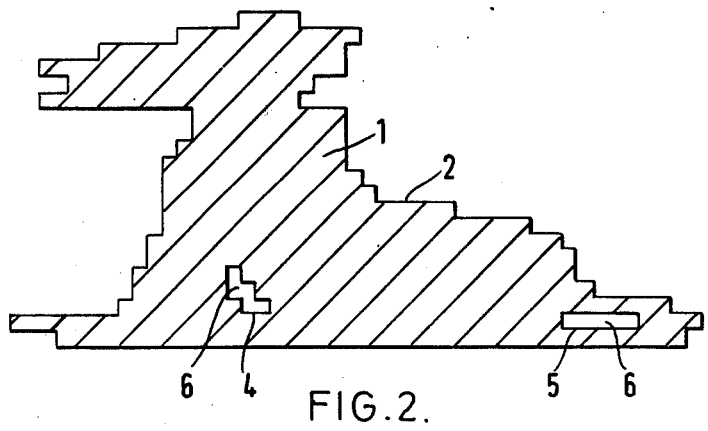
FIG. 2 shows a representation of the image of FIG. 1 compressed in the vertical direction only to a third of its original height.

Referring to FIGS. 1 to 3 there is shown a black area 1, defined by lines 2, 3, 4 and 5. The area 1 is built-up of a plurality of basic black square areas shown hatched. White areas 6 within the lines 3, 4 and 5 are also constituted by a plurality of basic square areas; the black and white areas together providing an image which may be said to be that of a sitting animal.

In order to enable the representations of FIG. 1 shown in FIGS. 2 and 3 to be produced, the image shown in FIG. 1 is notionally divided-up in a reticular manner by a grid defining a large number of square areas, as indicated at 10.

Each of the areas 10 is coded by means of a digital code, e.g. a binary or mark-space code in which a black area 10 is represented by 1 and a white area 10 is represented by 0, and the coded information is stored on a record medium, e.g. a paper or magnetic tape, by scanning the image from top to bottom vertically in lines running from left to right of the image as its appears in FIG. 1.

This coded information is then operated upon in a way that will now be described with reference to FIGS. 4 and 5, like parts in these figures being referred to by the same reference numerals.

Figure 4:
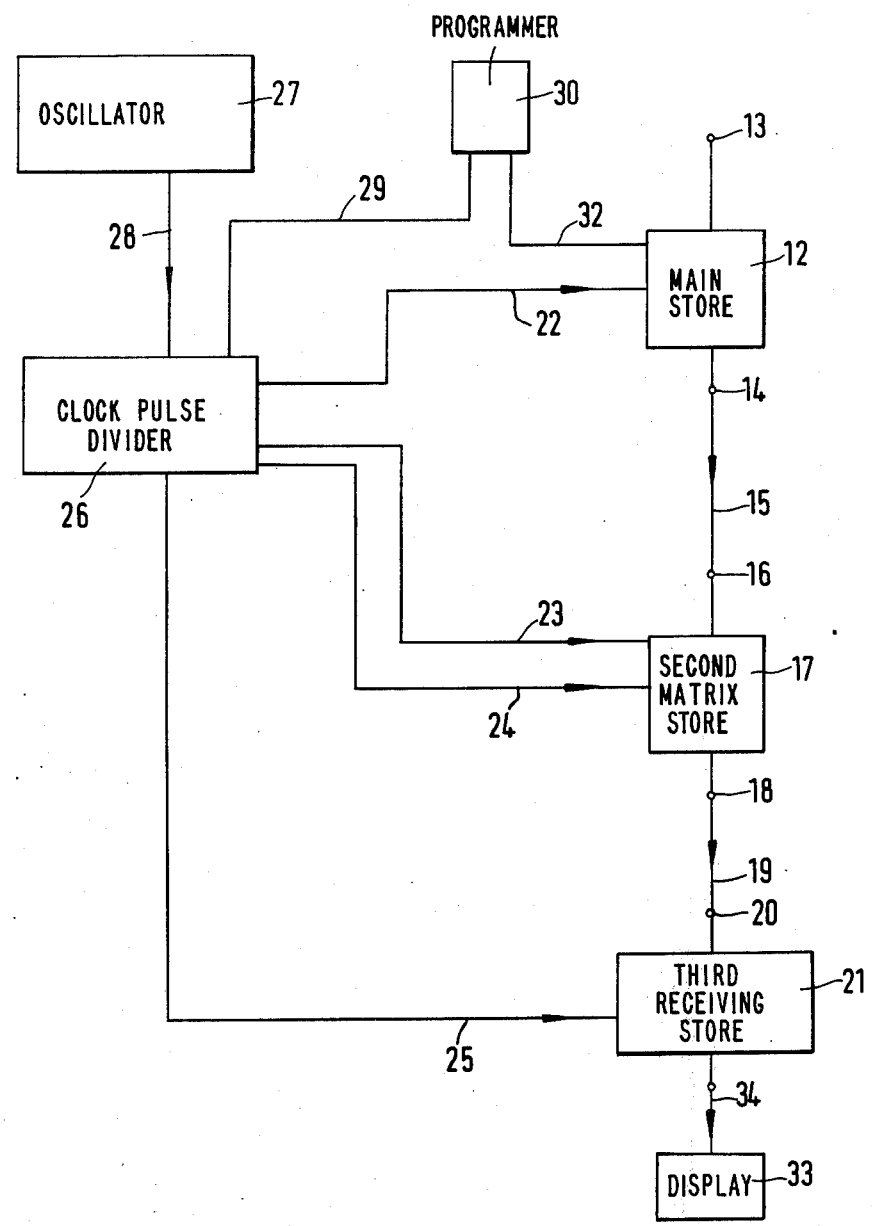
FIG. 4 is a block schematic electric circuit diagram and FIG. 5 is a block schematic electric circuit diagram showing a modification of the FIG. 4 arrangement.

Referring to FIG. 4, there is shown a first or main store 12 having a input 13. An output 14 from the store 12 is coupled via a line 15 to an input 16 of a second matrix store 17 which is in the form of a random access memory. An output 18 from the store 17 is applied via a line 19 to the input 20 of a third, receiving, store 21. Clock pulses are fed to the stores 12, 17 and 21 on lines 22, 23 and 24 and 25 respectively from a number of programmable dividers indicated at 26, under the control of signals from a high frequency oscillator 27 on a line 28 and signals on a line 29 from a programmer unit 30. The operation of the programmer unit 30 is synchronised with the reading-out of information from the main store 12 over a line 32.

Information can be read out of the store 21 for display on a display unit 33, which may, for example, be a cathode ray tube or a mosaic printer, via a line 34.

In operation, information stored on a record member such as a magnetic tape in the way described with reference to FIGS. 1–3 is fed into the store 12 via the input 13. At the same time, programme information is fed into the programmer unit 30. The high frequency oscillator 27 controls the programmable dividers indicated at 26 and these dividers provide output clock pulses on the line 22 at a first frequency, for example, at M Hz, to the main store 12, input clock pulses on the line 23 at a second frequency, for example, N Hz, to the memory 17, output clock pulses at a third frequency, for example, P Hz, to the store 17, and input clock pulses at a fourth frequency, for example, Q Hz, to the receiving store 21.

The information stored in the store 12 is scanned in a first, vertical, direction one column at a time, and read out in serial form on the line 15 at M bits per second.

In one method of operating the arrangement, this data is then compressed in the vertical direction by clocking it into the memory 17 under the control of the pulses on the line 23, whose frequency N Hz, so that the compression ratio is N/M. A case in which the vertical compression ratio is 3:1 is illustrated by the compression of the original image of FIG. 1 as it appears in FIG. 2.

In order to provide horizontal compression of this stored information to produce the representation shown in FIG. 3, where a horizontal compression ratio of 3:1 has been produced, the data in the store 17 is first scanned in the horizontal direction, one row at a time under the control of the clock pulses on the line 24 in order to provide a serial read-out of the data in the store 17 at P bits per second on the line 19. This data is then read into the store 21 under the control of the clock pulses on the line 25, to produce a compression of the information in the horizontal direction by the ratios Q/P, the ratio between the frequency of the clock pulses on the line 25 and the rate at which the data is fed into the store 21 via the input 20.

It is possible by means of the programming unit 30 to control the frequency of the dividers indicated at 26 such that ratios N/M and Q/P can be produced that result in either an expansion or a compression in either the horizontal or vertical direction of the information stored in the stores 17 and 21.

It will be appreciated that it is possible to change these ratios by chaning one or more of the frequencies of the clocking pulses on the lines 22, 23, 24 and 25 at any time during the reading in or out of the information, so that different compression or expansion ratios can be applied to different parts of a representation or alternatively these ratios can be changed easily between one representation and another.

Figure 5:
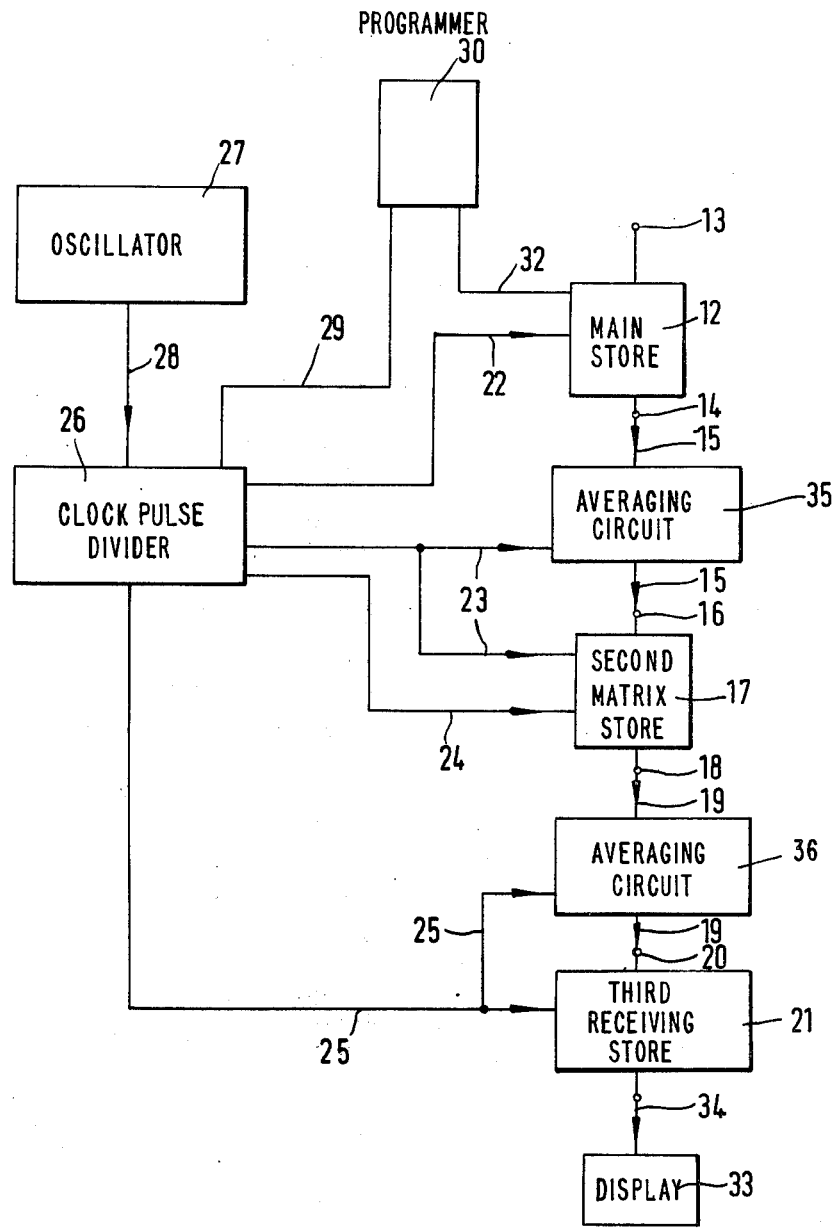

With reference to FIG. 5, there is shown a modification to the circuit of FIG. 4 in which an averaging circuit 35 is connected in the line 15 between the stores 12 and 17 and an averaging circuit 36 connected in the line 19 between the stores 17 and 21. The clock pulse line 23 is connected to the averaging circuit 35 and the clock pulse line 25 is connected to the averaging circuit 36. Since the signals on the lines 15 and 19 are digital it is possible for the averaging circuits 35 and 36 to count the number of digital pulses occurring during a period of the clock pulses on the lines 23 and 25 respectively and to produce a signal 1 output if the average level is greater than 50% of the maximum level and a signal 0 output if the average level is below the 50% level. By means of this arrangement it is possible to improve the shape of a compressed representation.

Although the invention has been described, by way of example, with reference to particular embodiments, it will be appreciated that variations and modifications can be made within the scope of the invention set out in the appended claims.

What is claimed is:

1. A method of providing a representation of an image, whose dimensions are different from those of the image, which includes the steps of feeding into a first store coded information derived by scanning the image in a first direction, reading out the information in the first store in serial form under the control of a first clock signal via an averaging circuit which counts the number of digital pulses occurring during a given period of the clock pulses to produce a signal 1 output if the average level is greater than a given value and a signal 0 output if the average level is below the given level, reading the information readout from the first store in serial form under the control of a second clock signal into a second matrix store to provide a record of information corresponding to the image scanned, scanning the information in the second store in a second direction to provide a serial readout of the information in the second store under the control of a third clock signal via an averaging circuit which counts the number of digital pulses occurring during a given period of the third clock pulses to produce a signal 1 output if the average level is greater than a given value and a signal 0 output if the average level is below the given level, reading the information readout from the second store into a third store under the control of a fourth clock signal, reading out information in the third store and displaying the information readout from the third store in a display device.

2. A method as claimed in claim 1 including the steps of developing from the signal read out from the first store a first average signal under the control of the second clock signal, the first average signal being the information read into the second matrix store and developing from the signal read out of the second store a second average signal under the control of the third clock signal, the second average signal being the information read into the third store.

3. Apparatus for use in the above method which includes a first store, means for reading information derived by scanning an image in a first direction into the first store, a first clock signal generator, the first clock signal generator being connected to the first store to control the rate at which information is read out of the first store in serial form, a second matrix store, the output of the first store being connected to the input of the second store whereby information read out of the first store can be read into the second store, a second clock pulse generator connected to the second store to control the rate at which information is read into the second store, means to scan the second store in a second direction to provide a read-out in serial form from the second store, a third clock pulse generator connected to the second store to control the rate at which information is read out from the second store, a third store, the input of the third store being connected to the output of the second store whereby information from the second store can be read into the third store, a fourth clock pulse generator connected to the third store to control the rate at which information from the second store is read into the third store, a display device, means to couple an output from the third store to the display device, a first averaging circuit which counts the number of digital pulses occurring during a given period of the clock pulses to produce a signal 1 output if the average level is greater than a given value and a signal 0 output if the average level is below the given level, the output from the first store being connected to the input to the first averaging circuit, the output from the first averaging circuit being connected to the input to the second store and the second clock pulse generator being connected to the first averaging circuit and a second averaging circuit which counts the number of digital pulses occurring during a given period of the third clock pulses to produce a signal 1 output if the average level is greater than a given value and a signal 0 output if the average level is below the given level, the output from the second store being connected to the input to the second averaging circuit, the output from the second averaging circuit being connected to the input to the third store and the fourth clock pulse generator being connected to the second averaging circuit.

* * * * *

UNITED STATES PATENT AND TRADEMARK OFFICE
CERTIFICATE OF CORRECTION

PATENT NO. : 4,153,896
DATED : May 8, 1979
INVENTOR(S) : Roy Leonard White

It is certified that error appears in the above-identified patent and that said Letters Patent are hereby corrected as shown below:

Column 1, Line 17, insert --to-- between "relating" and "a"

Column 1, Line 38, "notionally" s/b --notationally--

Column 3, Line 20, "notionally" s/b --notationally--

Column 3, Line 29, "its" s/b --it--

Column 3, Line 36, "a" s/b --an--

Column 3, Line 41, "synchronised" s/b --synchronized--

Column 3, Line 55, "programme" s/b --program--

Column 4, Line 4, insert --is-- between "frequency" and "N Hz"

Column 4, Line 29, "chaning" s/b --changing--

Column 6, Line 13, insert --and-- between "device" and "means"
(Claim 3)

Signed and Sealed this

Sixth Day of November 1979

[SEAL]

Attest:

RUTH C. MASON
Attesting Officer

LUTRELLE F. PARKER
Acting Commissioner of Patents and Trademarks